(12) United States Patent
Abdurachmanov

(10) Patent No.: US 6,617,547 B1
(45) Date of Patent: Sep. 9, 2003

(54) ARC STRAY CONTROLLING WELDING APPARATUS

(76) Inventor: Ilich Abdurachmanov, 150-15 79th Ave., Flushing, NY (US) 11367

( * ) Notice: Subject to any disclaimer, the term of this patent is extended or adjusted under 35 U.S.C. 154(b) by 0 days.

(21) Appl. No.: 10/238,080

(22) Filed: Sep. 10, 2002

(51) Int. Cl.$^7$ ................................................ B23K 9/08
(52) U.S. Cl. ................................. 219/123; 219/124.1
(58) Field of Search ............................... 219/123, 124.1

(56) References Cited

U.S. PATENT DOCUMENTS

| | | | |
|---|---|---|---|
| 2,994,763 A | 8/1961 | Schultz | |
| 3,602,687 A | 8/1971 | Pollock | |
| 3,626,145 A | 12/1971 | Jackson | |
| 4,190,760 A | 2/1980 | Kano | |
| 4,223,200 A | 9/1980 | Moench | |
| 4,485,292 A | 11/1984 | Mizuno | |
| 4,761,536 A | 8/1988 | Blakeley | |
| 4,975,558 A | 12/1990 | Lukens | |
| 5,345,058 A | 9/1994 | Jones | |
| 5,446,257 A | 8/1995 | Sakamoto | |

FOREIGN PATENT DOCUMENTS

| | | | |
|---|---|---|---|
| GB | 2045473 | * 10/1980 | ................. 219/123 |
| JP | 11-291038 | * 10/1999 | |

\* cited by examiner

Primary Examiner—Clifford C. Shaw
(74) Attorney, Agent, or Firm—Boris Leschinsky

(57) ABSTRACT

A welding apparatus controlling a position of a welding arc, having a welding head housing an electrode producing the welding arc in a working zone. The apparatus has an electromagnet compensating a magnetic field in the working zone and at least two photoelectric elements, each of the elements having its viewing area. Viewing areas of photoelectric elements intersect forming a cross-view field. Photoelectric elements are electrically connected to each other in bridge and to the electromagnet. When the welding arc is strayed, the cross-view field is displaced, the bridge connection becomes unbalanced and a certain potential is supplied from the photoelectric elements to the electromagnet. When this potential is supplied to the electromagnet, it compensates the magnetic field in the working zone by returning the arc into a proper position.

4 Claims, 3 Drawing Sheets

ARC STRAY CONTROLLING WELDING APPARATUS

FIELD OF THE INVENTION

The invention relates to the control means for the arc of an automatic DC welding device, and more particularly to a welding apparatus controlling a position of the arc with photoelectric elements.

BACKGROUND OF THE INVENTION

A long recognized problem in welding, specifically electric arc welding, is arc stray or drift. This problem often results in a poor weld due to the varying, non-uniform blow of the arc on the seam to be welded. A variety of methods and apparatus have been devised to control arc stray. U.S. Pat. No. 1,947,077 to Chapman, for example, utilizes an electric current through a backing strip or U-shaped element that creates a magnetic field. This field co-acts with the field set up by the welding electrode to "blow" the arc forward in advance of the electrode as it moves along the seam. U.S. Pat. No. 388,245 to Bernardos utilizes an electromagnet located beneath the plates to be welded to influence the electric arc U.S. Pat. No. 2,773,969 to Gunther utilizes a "magnetic girdle" for use with pipelines. U.S. Pat. No. 2,472,851 to Landis utilizes a plurality of coils concentric with an annular electrode to control arc movement in a circular path. U.S. Pat. No. 2,475,183 to Gibson includes a magnet with a pole piece extension to deflect the arc toward the pole piece and thus control its direction during welding. U.S. Pat. No. 3,584,181 to Nemote includes a magnetizing coil that surrounds a rod-shaped workpiece. The magnetizing coil is intended to overcome the circular field created by welding current. Each of these prior art apparatus and methods attempts to control the direction of arc movement by imposing a magnetic field upon it. Such apparatus and methods have been ineffective because of the difficulty in determining and maintaining the proper magnitude and direction of the magnetic field required to achieve the desired effect on the arc. Often the actual effect of such devices is to exacerbate the problem of arc stray.

U.S. Pat. No. 2,994,763 to Schultz and U.S. Pat. No. 3,626,145 to Jackson attempt to overcome the varying magnetic effects by monitoring certain parameters. Schultz uses a pair of photoelectric cells to monitor the position of the arc and an electromagnet that is responsive to the sensed arc position. The electromagnet is intended to produce a force field that compensates for detected drift. Jackson uses a Hall-effect probe mounted immediately ahead of the arc to detect the magnetic environment about the arc. A detector and control circuit is intended to receive signals from the probe and control the current to an electromagnet to set up a "preselected and optimized" magnetic environment. The drawback to such systems is the inability to determine and control an optimum magnetic environment. Systems that attempt to manipulate the arc path with external magnetic fields have been ineffective.

Additional apparatus and methods have been devised for providing a better weld through the use of a controlled magnetic field. Specifically, U.S. Pat. No. 4,107,503 to Koshiya and U.S. Pat. No. 4,716,536 to Blakeley seek to overcome residual or remnant magnetic fields that are found in ferritic materials to be welded. Koshiya is directed to a system to counter magnetic fields created by prior welding operations. In Koshiya, in order to reduce arc blow occurring during welding of the outside of a pipe blank, the direct current in the line feeding the consumable electrode is reversed from that supplied during welding on the inside of the pipe blank. The same magnitude of current is used for welding and for eliminating residual magnetism. This method is often ineffective because the residual magnetism in the pipe blank is not always caused solely by the prior welding operation and simply reversing the current can exacerbate arc blow. Further this system is only applicable to situations where a prior welding operation has been performed and the magnitude and direction of the welding current are known. Blakeley attempts to remove remnant magnetic fields by placing loops of coils on the plates to be welded adjacent to the weld joint. Current is passed through the coils in a direction and magnitude sufficient to counter the remnant magnetic field as measured by a gauss-meter. However, laying of coils in the area of welding can be cumbersome. Further, proper selection of the placement and exact alignment of coils to achieve the desired magnetic effect may be difficult in actual practice.

SUMMARY OF THE INVENTION

It is an object of the present invention to provide a simplified and reliable welding apparatus capable of substantially reducing the arc stray effect.

It is another object of the present invention to provide the arc stray reducing welding apparatus capable working in a high magnetic field.

The above-enumerated objects are accomplished by providing a welding apparatus having a welding head housing an electrode producing the welding arc in a working zone. The apparatus has an electromagnet compensating a magnetic field in the working zone and at least two photoelectric elements, each of the elements having its viewing area. Viewing areas of photoelectric elements intersect forming a cross-view field. Photoelectric elements are electrically connected to each other in bridge and to the electromagnet. When the welding arc is strayed, the cross-view field is displaced, the bridge connection becomes unbalanced and a certain potential is supplied from the photoelectric elements to the electromagnet. When this potential is supplied to the electromagnet, it compensates the magnetic field in the working zone, by returning the arc into a proper position.

Contrary to other arc stray controlling welding apparatuses known in the art, the apparatus of the present invention does not measure the null value of the magnetic field and then place the welding head into the position corresponding to this null value. Instead, the present apparatus precisely positions the arc above the jointer of two work-pieces using the balance between photoelectric elements 2 and 3, that, in turn, guarantees automatic compensation of the magnetic field through the electromagnet 5.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
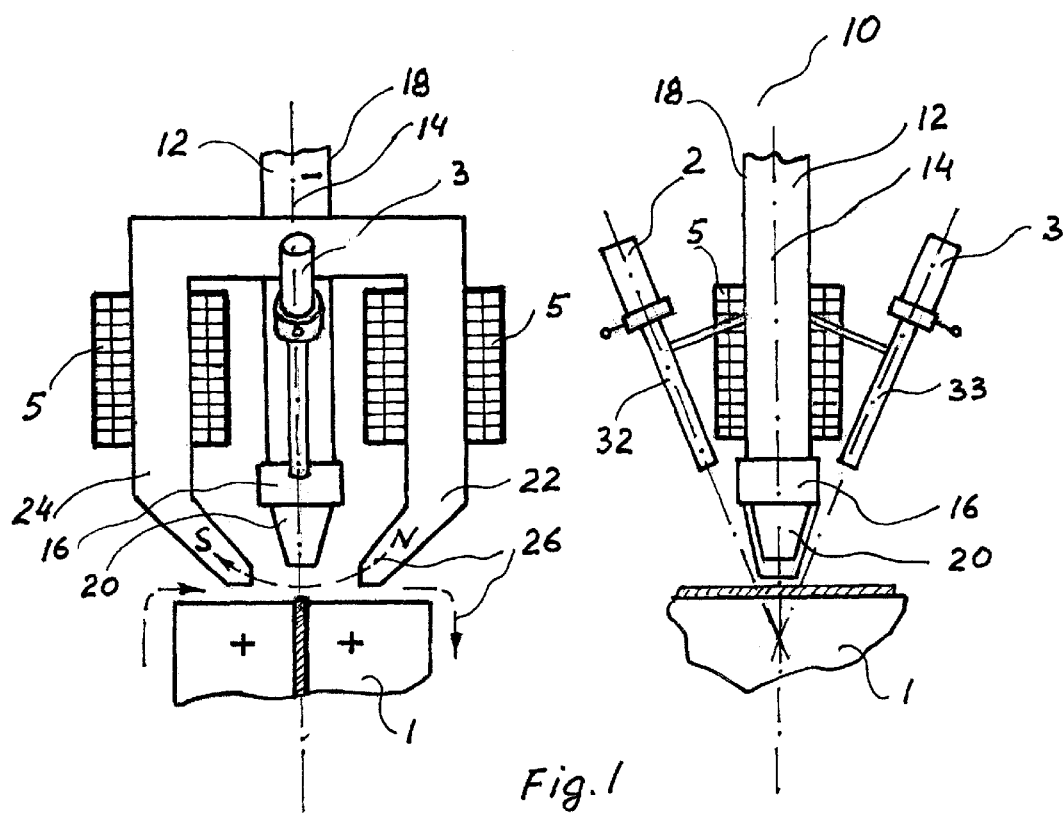
FIG. 1 is a front and side schematic view of the welding apparatus in accordance with the preferred embodiment of the present invention.

As shown in FIG. 1, in the preferred embodiment of the present invention, a welding apparatus 10 is provided, which comprises an electrode 20 disposed in an electrode holder 12 having a central axis 14. The central axis of the electrode holder corresponds to the central axis of the electrode 20. The holder 12 is preferably constructed of a non-magnetic material and includes a welding head 16 and a tube portion 18. The welding head 16 is engaged with the tube portion 18 leading to a current source (not shown) for the electrode 20.

Figure 2:
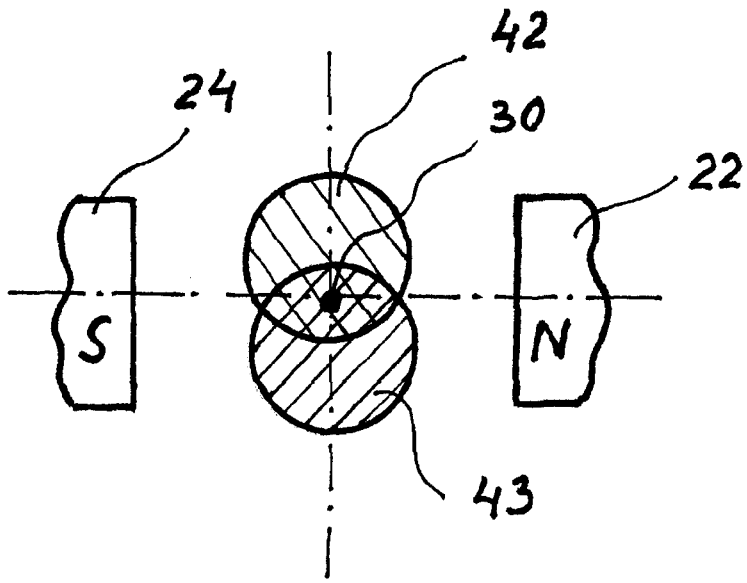
FIG. 2 is a schematic diagram of intersecting viewing areas of two photoelectric elements of the welding apparatus.

Welding apparatus 10 is further provided with at least two photoelectric elements 2 and 3 disposed within their corresponding tubes 32 and 33. Each photoelectric element 2 and 3 has its own view field 42 and 43, respectively. As shown in FIG. 2, view fields of photoelectric elements intersect forming a cross-view field 30, which is centered in a point corresponding to the central axis of the electrode 20. When the arc is properly positioned above a joint edge of two work-pieces to be welded by the apparatus, the center of the cross-view field 30 will be located right above the jointer.

Figure 3:
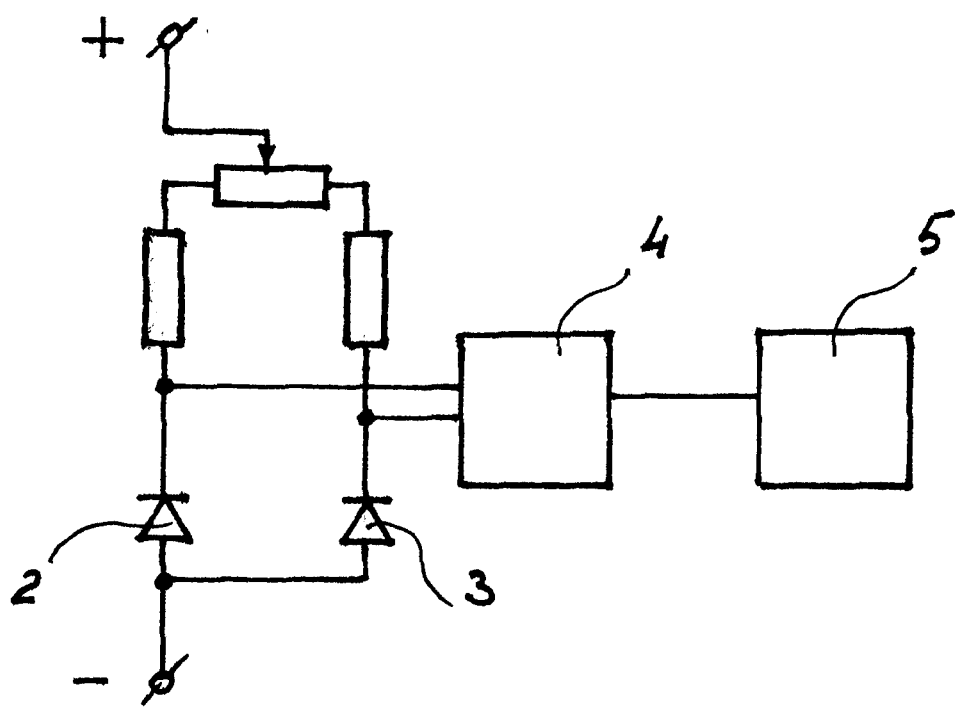
FIG. 3 is schematic diagram of the electrical connection between photoelectric elements and the electromagnet.
Figure 6:
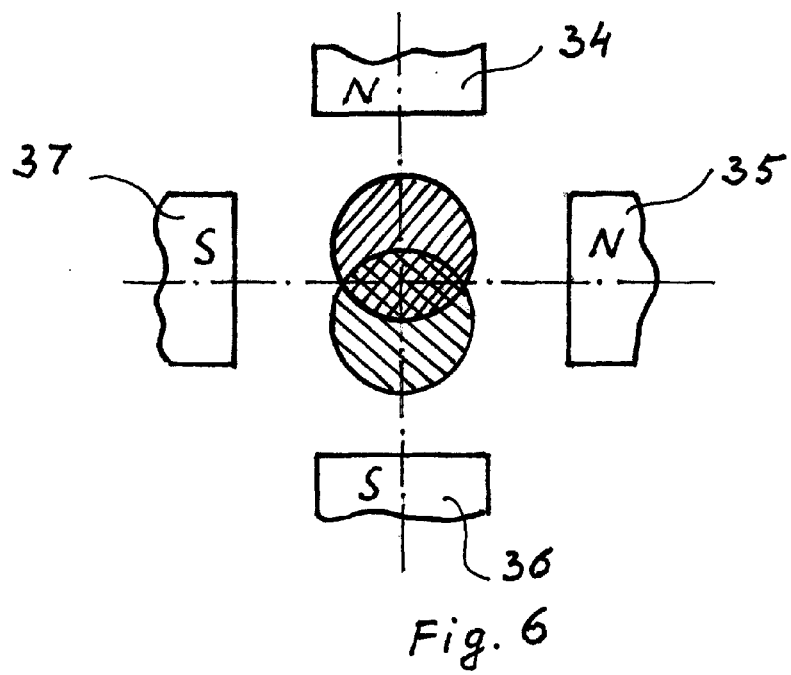
FIG. 6 is a schematic diagram of intersecting viewing areas of two photoelectric elements in a welding apparatus having an electromagnet with four poles.

In the preferred embodiment of the invention, an electromagnet 5 having at least two poles, i.e., a North pole 22 and a South pole 24, is provided for compensating the magnetic field of the work-piece. At the beginning of the welding process, when the magnetic field of the work-piece is not compensated, this field influences the welding arc to move in a direction perpendicular to the direction of the field. The direction of the field is designated with reference numeral 26. When the magnetic field is not compensated, one of the photoelectric elements 2, 3 is receiving a higher radiation than the other. As shown in FIG. 3, elements 2 and 3 are connected in bridge, therefore higher radiation received by one element causes the bridge to unbalance. This in turn results in creation of a potential at an output of the bridge, which is applied to the electromagnet 5 through the controlling block 4. Thus, the intensity and direction of the compensating field of the electromagnet 5 is directly connected to the degree of unbalance between the photoelectric elements.

As is clear from the above description and contrary to previously known arc-controlling devices, the present apparatus does not measure the null value of the magnetic field and then place the welding head into the position corresponding to this null value. Instead, the present apparatus precisely positions the arc above the jointer of two work-pieces using the balance between photoelectric elements 2 and 3 in a negative feedback loop, that, in turn, guarantees automatic compensation of the magnetic field through the electromagnet 5.

Figure 7:
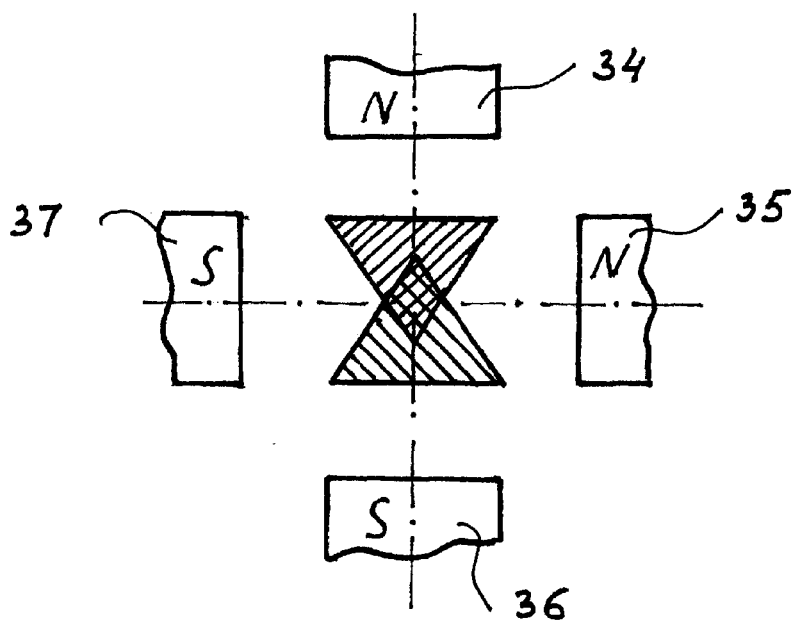
FIG. 7 is a schematic diagram of intersecting viewing areas of two photoelectric elements having a different geometry due to the use of viewing screens.

In another embodiment of the present invention, to improve the field compensation of the electromagnet 5, the electromagnet may be provided with four poles, i.e., two North poles 34 and 35 and two south poles 36 and 37, as shown in FIGS. 4–7. Additionally, to improve the sensitivity of photoelectric elements 2 and 3, various screens may be installed at the bottom opening of tubes 32 and 33 to change the geometry of viewing areas of the photoelectric elements. For example, as shown in FIG. 7, by installing such screens the viewing areas may be shaped as two triangles intersecting at their apex portions. This configuration results in a higher exit potential when the arc is moved out of position and the bridge shown in FIG. 3 becomes unbalanced.

Figures 4, 5:
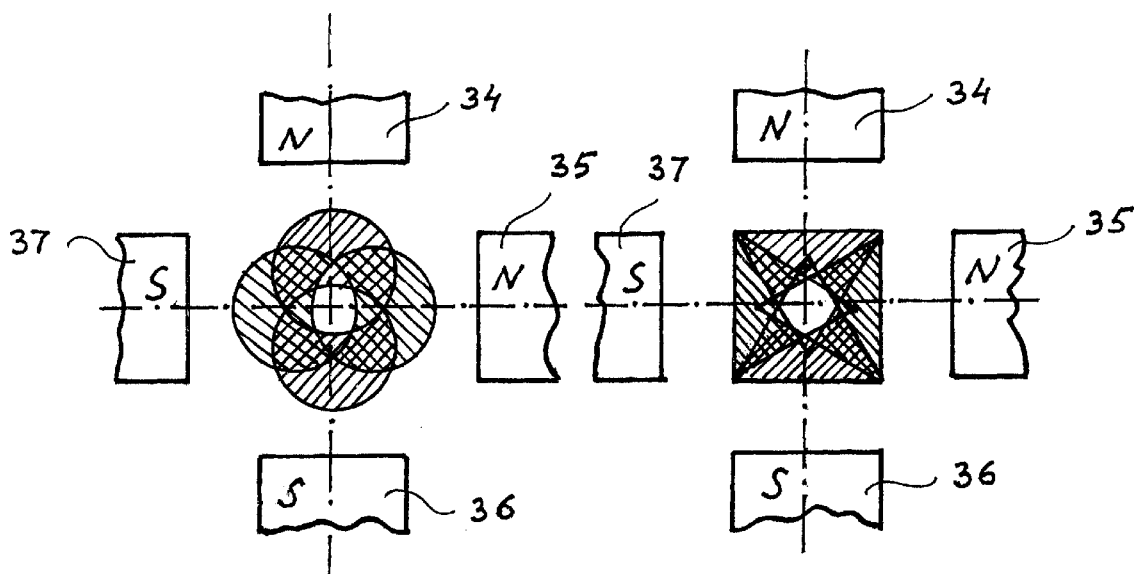
FIG. 4 is a schematic diagram of intersecting viewing areas of four photoelectric elements in a welding apparatus having an electromagnet with four poles.
FIG. 5 is a schematic diagram of intersecting viewing areas of four photoelectric elements having a different geometry due to the use of viewing screens.

In another embodiment of the present invention, two pairs of photoelectric elements are provided in the welding apparatus. The second pair of photoelectric elements is preferably rotated by 90° with respect to the first pair. This configuration of photoelectric elements allows the apparatus to control the welding arc in two dimensions (X and Y), instead of just one linear dimension as described in the above preferred embodiment. This embodiment also allows to reduce the width and the length of the welding arc, thereby, increasing the quality of the resulting seam. It also allows the welding apparatus to make a shaped seam without rotating the welding head 16. As shown in FIGS. 4 and 5, various geometries of elements' viewing areas may be accomplished in this embodiment by using viewing screens.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim as follows:

1. A welding apparatus controlling a position of a welding arc, comprising:

at least two photoelectric elements, each of said elements having a viewing area and a viewing axis, wherein said photoelectric elements are electrically connected to said electromagnet, wherein said viewing axes of said photoelectric elements converge at a point away from said welding arc so that said viewing areas of said photoelectric elements intersect in a cross-view field; wherein when said welding arc is strayed said cross-view field is displaced and a certain potential is supplied from said photelectric elements to said electomagnet; and wherein when said certain potential is supplied to said electromagnet, said electromagnet compensates said magnetic field in said working zone by returning said welding arc into a proper position.

2. The welding apparatus according to claim 1 wherein each of said photoelectric elements further comprises at least one viewing screen, said viewing screen changing geometries of said viewing areas of said photoelectric elements.

3. A welding apparatus controlling a position of a welding arc, comprising:

a welding head producing said welding arc in a working zone;

an electromagnet compensating a magnetic field in said working zone;

at least four photoelectric elements forming two pairs of photoelectric elements, each of said elements having a viewing area, wherein said photoelectric elements are electrically connected to said electromagnet, wherein said viewing areas of said photoelectric elements intersect in a cross-view field; wherein when said welding arc is strayed said cross-view field is displaced and a certain potential is supplied from said photoelectric elements to said electromagnet; and wherein when said certain potential is supplied to said electromagnet, said electromagnet compensates said magnetic field in said working zone by returning said welding arc into a proper position.

4. A welding apparatus controlling a position of a welding arc, comprising:

a welding head producing said welding arc in a working zone;

an electromagnet compensating a magnetic field in said working zone;

at least two photoelectric elements, each of said elements having a viewing area of a generally triangular geometric shape, wherein said photoelectric elements are electrically connected to said electromagnet, wherein said viewing areas of said photoelectric elements intersect in a cross-view field; wherein when said welding arc is strayed said crossview field is displaced and a certain potential is supplied from said photoelectric elements to said electromagnet; and wherein when said certain potential is supplied to said electromagnet, said electromagnet compensates said magnetic field in said working zone by returning said welding arc into a proper position.

* * * * *